United States Patent
Curbera et al.

(10) Patent No.: US 6,260,042 B1
(45) Date of Patent: Jul. 10, 2001

(54) QUICK DIFFERENCE AND UPDATE FOR TREE STRUCTURE DATA

(75) Inventors: Francisco Phelan Curbera, Bronx; David Alexander Epstein, Ossining, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/186,094

(22) Filed: Nov. 5, 1998

(51) Int. Cl.[7] ............................... G06F 7/00; G06F 17/00
(52) U.S. Cl. ............................... 707/101; 707/7; 706/13; 706/46; 706/47; 706/59; 709/221
(58) Field of Search ....................... 707/101, 100, 707/103, 104, 102, 203, 7; 709/221; 706/13

(56) References Cited

U.S. PATENT DOCUMENTS 5,911,072 * 6/1999 Simonyi .............................. 395/705

OTHER PUBLICATIONS

Zhang et al. "Simple Fast Algorithms For the Editint Distance Between Trees and Related Problems", SIAM J Comp., vol. 18, No.6 pp 1245–1562, Dec. 1989.*

A.Jadhav et al. "Reduced–tree–based soft decoding for block–coded modulation", IEE Proc., Comm., vol. 144, No.2, Apr. 1997.*

R. Rivest "The MD5 Message–Digest Algorithm", MIT Laboratory for Computer Science and RSA data Security, Inc., Apr. 1992.*

Uramoto et al. "Digest Values for DOM (DOMHASH) Proposal", IBM Research, Tokyo Research Laboratory, Jun. 1998.*

* cited by examiner

*Primary Examiner*—Thomas Black
*Assistant Examiner*—Jacques Veillard
(74) *Attorney, Agent, or Firm*—McGuireWoods, LLP; Stephen C. Kaufman

(57) ABSTRACT

Efficient differencing and update mechanisms operate directly on the native representation of the data. No irrelevant differences are introduced by the process. The difference reports generated are stated in terms of the basic operations that can be performed on a data tree, thus requiring no additional interpretation, and making it amenable to direct human inspection and understanding. This mechanism can become a central part of any version management system.

8 Claims, 3 Drawing Sheets

QUICK DIFFERENCE AND UPDATE FOR TREE STRUCTURE DATA

BACKGROUND OF THE INVENTION

1. Field of the Invention

The present invention relates to an efficient mechanism for the differentiation and update of data structured in tree format. The invention has particular application to version management of tree structured data but the tree differentiation process according to the invention can differentiate any two trees, regardless of whether they are successive versions or not.

2. Background Description

The information used by computer programs can be represented in multiple formats. There is, however, a growing trend towards moving much of these data into a standardized tree structured for-mat. The XML (eXtensible Markup Language) and DOM (Document Object Model) standard proposals are two leading efforts in this trend. The prospect of having a preferred data representation format raises the question of the adequacy of the existing mechanisms of data management.

Consider the case of information (source code, textual data, etc.) that varies over time. Version management is then a critical issue. At the core of the version management issue lies the following problem: given two successive states of the information, it is necessary to be able to describe the informational difference between these two versions, and to bring older versions up to date with newer ones.

In the current approach, version management is achieved by managing external representations of the data, rather than the data itself. The information is first converted into some conventional representation, typically a sequence of text lines or bytes, which is then processed. The internal structure of the data is irrelevant in this model; rather, all information is treated as a more or less unstructured sequence of tokens.

While sufficient for many computational purposes, this model has two major drawbacks. The first one arises from the intrinsic ambiguity of the conversion to an external format: the same data can have multiple external representations in a given format. As a result irrelevant difference reports ("false negatives") are often generated.

Second, and most important, the way differences are reported (e.g., in terms of byte or line mismatches) bears no relation with the intrinsic structure of the data, and requires an additional "interpretative" step to infer the actual informational difference.

It would seem then that there are big advantages in doing version management directly on the internal representation of the data. When tree structured data is considered, however, there is one major obstacle: the high computational cost of the tree differentiation algorithms. As an indication of this, consider the cost of the optimal tree differencing algorithm: for labeled ordered trees, the cost is no less than > Nodes(tree 1)×leaves(tree 1)×Nodes(tree 2)×leaves(tree 2), that is, the cost increases at least quadratically when the size of the tree increases. For unordered labeled trees the situation is still worse. Optimal differentiation has exponential cost in the worst case,
>
> Nodes(tree 1)×Nodes(tree 2)+[leaves(tree 1)]!×3**[leaves(tree 1)1×Nodes(tree 2)×. . .

The consequence is that tree differencing algorithms become impractical for most realistic problems as soon as the size of the trees involved starts to grow, unless large amounts of time and computing power are available.

SUMMARY OF THE INVENTION

It is therefore an object of the present invention to provide an efficient mechanism for the differentiation and update of data structured in tree format.

According to the invention, there is provided an efficient differencing and update mechanisms that operates directly on the native representation of the data. No irrelevant differences are introduced by the process. The difference reports generated are stated in terms of the basic operations that can be performed on a data tree, thus requiring no additional interpretation, and making it amenable to direct human inspection and understanding. This mechanism can become a central part of any version management system.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
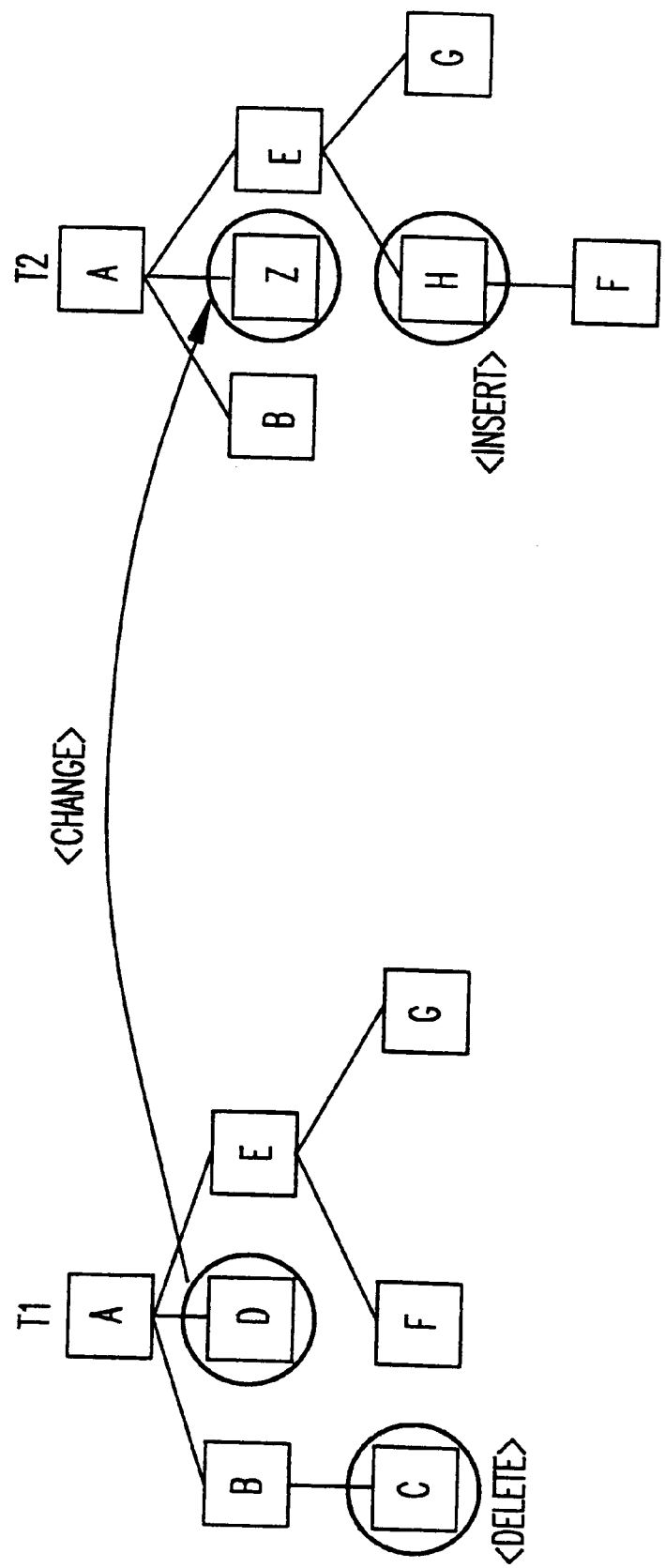
FIG. 1 is a simplified representation of the process of editing tree structured data by means of elementary tree editing operations.

Referring now to the drawings, and more particularly to FIG. 1, there is shown by way of example a graphical representation of editing a tree structure of the information database using elementary tree editing operations, like "change", "delete", or "insert". More particularly, the tree structure on the left, denoted T1, is modified by three editing operations to produce the tree on the right, denoted T2. In FIG. 1, a "delete" operation is shown removing leaf C from T1, a "change" operation is shown modifying the information (label) of node D in T1 to become node Z in T2, and an "insert" operation is shown inserting the new node H between node E and the leaf F. Herein, a sequence of editing operations that transforms a tree T1 to a tree T2 will be called an "edit path" between T1 and T2.

The processes illustrated in FIG. 1 are editing functions well understood in the data processing arts for editing tree structured data. The problem in maintaining such a tree structured database is how to efficiently differentiate and update successive versions of the data.

The invention improves the difference and update process by working directly on the native tree representation of the data, and expressing the differences between the trees in terms of basic "tree edit" operations (like "delete", "change", or "insert"). In turn, this requires addressing the problem of the high computational cost of tree differentiation.

To solve this problem, a two step tree differencing process is introduced. The first step is a fast sub-tree matching procedure that uses a digital finger print (also called message digest or digest value herein) to detect identical sub-trees. See, for example, R. Rivest, "RFC 1321 The MD5 Message-Digest Algorthim", MIT Laboratory for Computer Science and RSA Data Security, Inc.,April 1992, and H. Maruyama, K. Tamura and R. Uramoto, "Digest Values in DOM (DOMHASH) Proposal", June 1998. This step reduces the size of the input trees, and with it the computational cost of the next step. The second step finds the difference between the simplified trees by computing the shortest edit path between them; that is, the least expensive sequence of tree editing operations required to transform one tree into another. A standard tree editing distance algorithm is used for this purpose. See, for example, K. Zhang and D. Shasha, "Simple Fast Algorithm for the Editing Distance Between Trees and Related Problems", *SIAM J. Comput.*, Vol. 18, No. 6, pp. 1245–1262, December 1989. The difference is represented as a sequence of tree editing operations which the update process used to transform an old version of the data into the new one.

The Differencing Process

Figure 2:
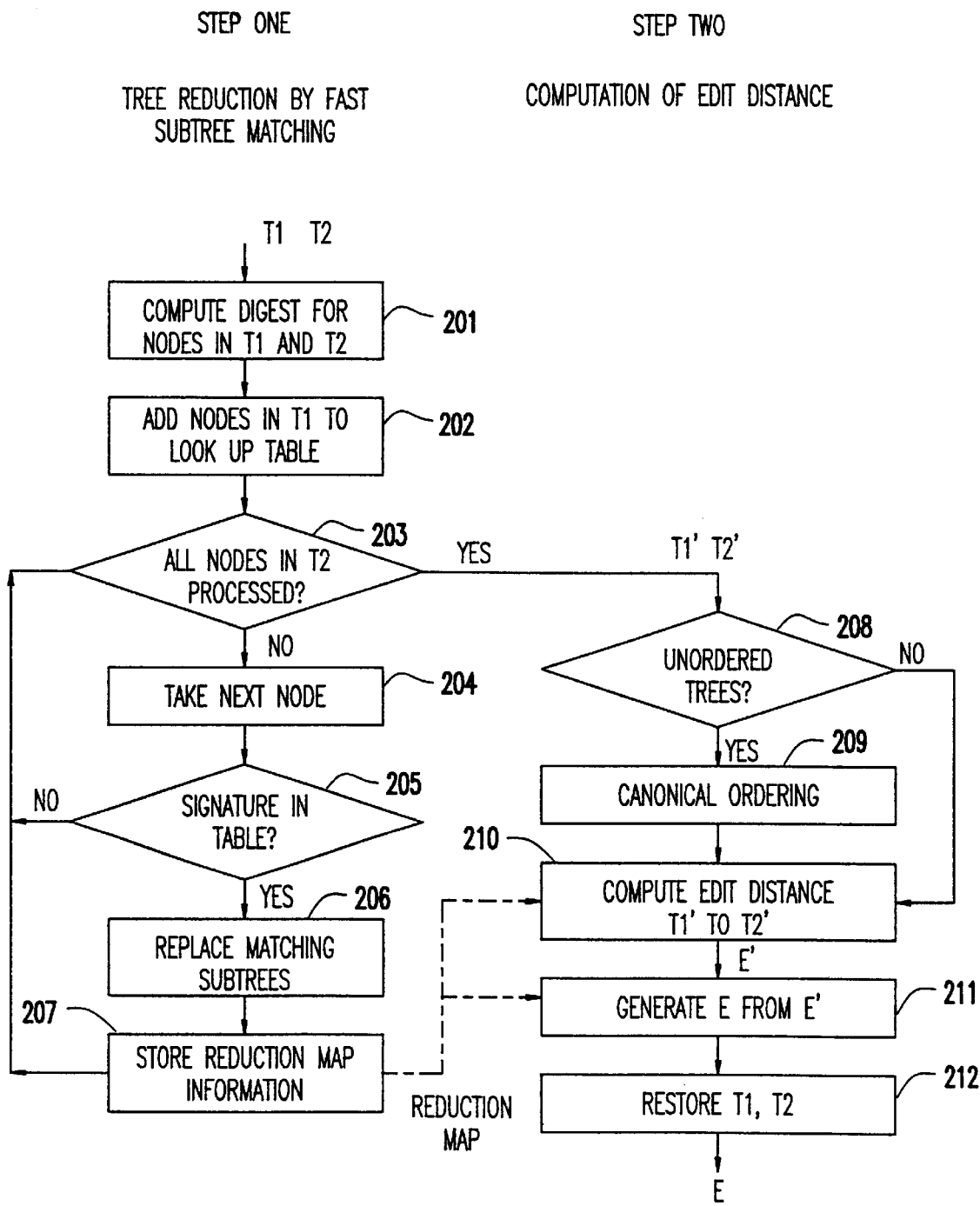
FIG. 2 is a flow diagram representing the logic of the fast tree differencing process according to the invention.

FIG. 2 shows the flow diagram for the fast tree differencing process according to the invention. The inputs to the process are two rooted tree structures, T1, T2. The output of the process is a sequence of tree edit operations E which edits T1 into T2.

Each node of the two input trees is assigned a digest value that identifies the sub-tree rooted at the node. The digest value of a node is defined in such a way as to uniquely identify sub-trees within an extremely high confidence level (see the DOMHASH proposal, supra). This is represented in FIG. 2 by function block 201. In function block 202, all the nodes in tree T1 are added to a fast look up table where the digest values are used as keys.

Next, a fast matching process in blocks 203 to 205 finds unique matches of digest values between nodes in trees T1 and T2. The digest value of each node in tree T2 is looked up in the table to find if there is a unique match with a node in T1, as shown in function block 204 and decision block 205. If a unique match is found, the sub-trees rooted at the matching nodes are removed from the original trees and replaced by two identical leaf nodes in function block 206. Information about the replaced branches of the tree is stored in a "reduction map" in function block 207 for later use in the second phase of the algorithm. The process then loops back to decision block 203 in order to complete the processing of all the nodes in tree T2.

When all the nodes in tree T2 have been processed, the reduction process is complete. This phase produces two simplified sub-trees T1' and T2'. If the input trees T1 and T2 are unordered trees, an additional simplification is carried out by ordering the simplified trees T1' and T2' according to a given canonical ordering. This involves imposing a predefined ordering among the children of every node. It permits treating unordered trees as ordered trees and thereby apply more efficient difference algorithms. This is shown in decision block 208 and function block 209.

A tree editing distance algorithm (like the one referenced above by Zhou and Shasha) finds the differences between the two trees (the edit path between them) in function block 210. Tree distance algorithms require the use of a "cost function" that provides the cost of each possible editing operation. The cost function used by the algorithm in function block 210 is dynamically generated based on the reduction map information stored in the previous phase of the process. In this way, the editing cost of individual operations in the simplified tree is kept consistent with that of the original tree. The difference between the trees is output as a sequence of tree edit operations E', which may include operations like "change", "delete", "insert", or others. Observe that E' edits T1' and T2'. The reduction map information is used in function block 211 to obtain the sequence E, which edits T1 and T2. Additionally, the same information from function block 206 can be used to restore trees T1' and T2' to their original states T1 and T2 in function block 212.

The Update Process

Figure 3:
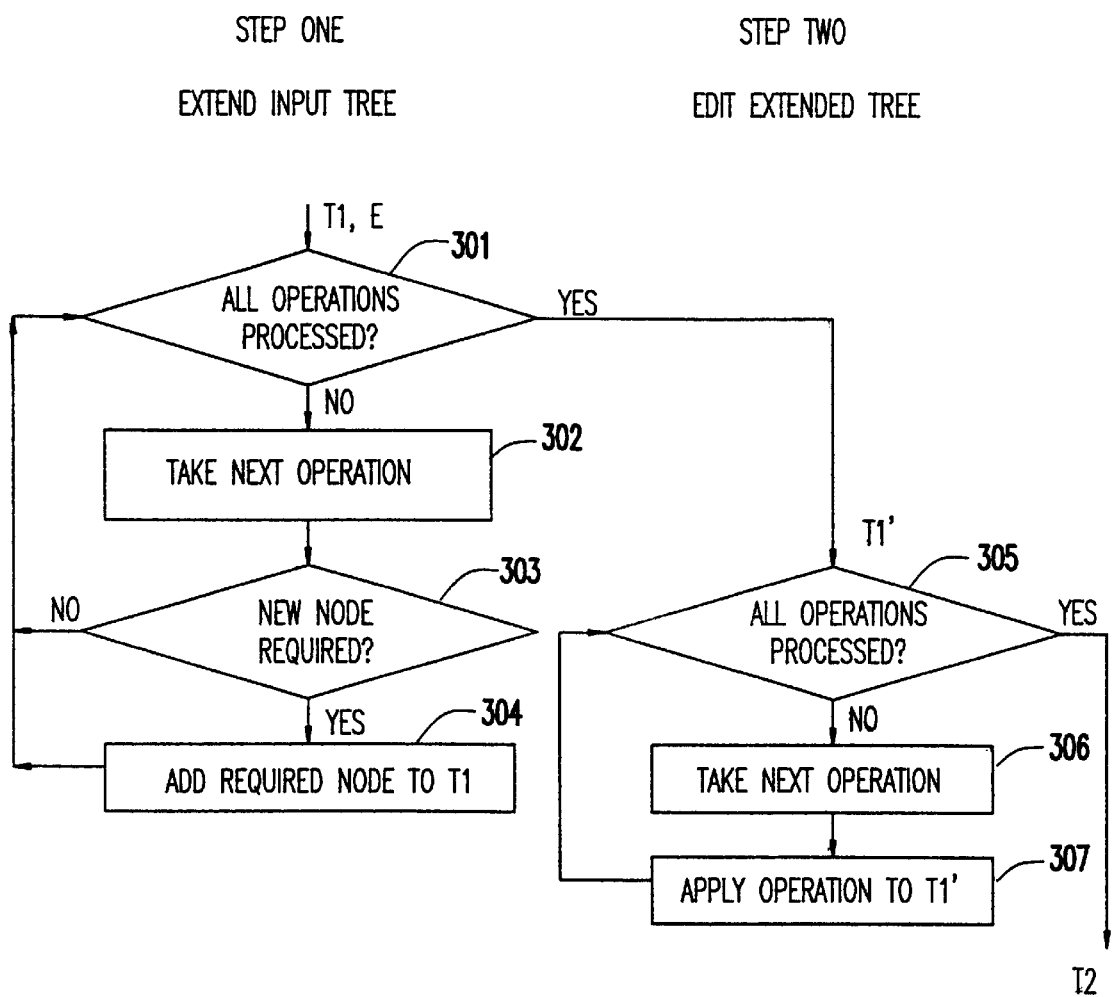
FIG. 3 is a flow diagram representing the logic of the tree update process according to the invention.

FIG. 3 is a flow diagram of the update process according to the invention. The input to the process is the source tree structure T1 and a sequence of edit operations E. The output of the process is the target tree T2.

The sequence of editing operations E is used to modify tree T1. The update process consists of two separate steps. In the first step, the sequence of edit operations is scanned to compile a list of all the nodes of the target that are not present in T1. This is shown in FIG. 3 in blocks 301 and 302, where a new operation is selected from E if possible, and in decision block 303, where the operation is checked to determine if a new node has to be added to tree T1. In that case, the required new node is added to T1 in function block 304. Then the process loops back to decision block 301 unit the complete sequence of operations E has been inspected.

The result of step one is in general a modified tree T1'. In step two, each operation from E is applied to the extended tree T1'; e.g., nodes may be deleted, have their information changed or be reattached to a different place in the tree. Hence, in blocks 305 and 306, the sequence of operations E is traversed once more, and each operation is applied to the extended tree T1' in function block 307. Once all operations have been processed, the resulting tree T2 is output.

While the invention has been described in terms of a single preferred embodiment, those skilled in the art will recognize that the invention can be practiced with modification within the spirit and scope of the appended claims.

What is claimed is:

1. A method of differentiation of data stored in a structured tree format, first and second tree structured data being denoted as trees T1 and T2, respectively, the method comprising the steps of:

reducing the trees T1 and T2 to reduced trees T1' and T2' by matching subtrees in the T1 tree to subtrees in the T2 tree, wherein the reducing step includes assigning a digest value to each node of trees T1 and T2, which digest value uniquely identifies a sub-tree rooted at the node, and matching digest values between subtrees T1 and T2 to find unique matches;

computing a difference between reduced trees T1' and T2'; and finding a difference between the trees T1 and T2 using the computed difference between the reduced trees T1' and T2'.

2. The method of differentiation of tree structured data recited in claim 1, wherein the step of reducing comprises the step of:

matching digest values between subtrees T1 and T2 to find unique matches; and replacing every pair of matching subtrees from trees T1 and T2 by a pair of matching leaf nodes to generate reduced sub-trees T1' and T2', respectively.

3. The method of differentiation of tree structured data recited in claim 2 further comprising the step of storing information about replaced matching sub-trees in a reduction map.

4. The method of differentiation of tree structured data recited in claim 3 wherein the steps of computing the difference between reduced trees T1' and T2' and finding the difference between trees T1 and T2 comprises the steps of:

computing a shortest edit path E' between reduced trees T1' and T2'; and generating an edit path E that edits tree T1 into tree T2 using the edit path E' and reduction map information.

5. The method of differentiation of tree structured data recited in claim 4 wherein the step of computing the shortest edit path E' uses a dynamic cost function.

6. The method of differentiation of tree structured data recited in claim 5 wherein the reduction map information is used to provide values of a dynamic cost function.

7. The method of differentiation of tree structured data recited in claim 1 wherein the tree T2 is a successive version of tree T1 and the method is used for version management of tree structured data.

8. A method of update of tree structured data by means of a sequence of editing operations, an initial tree structured data being denoted T1 and an edit path being denoted E, the method comprising the steps of:

scanning a sequence the edit path E to compile a list of all nodes of a target tree T2 that are not in tree T1 and adding the nodes to tree T1 to generate an extended tree; and applying each edit operation in E to the extended input tree to generate the target tree T2.

\* \* \* \* \*